United States Patent
Oda et al.

(10) Patent No.: US 12,442,716 B2
(45) Date of Patent: Oct. 14, 2025

(54) OPTICAL FIBER TEST METHOD AND OPTICAL FIBER TEST EQUIPMENT

(71) Applicant: NTT, Inc., Tokyo (JP)

(72) Inventors: Tomokazu Oda, Musashino (JP); Atsushi Nakamura, Musashino (JP); Yusuke Koshikiya, Musashino (JP); Nazuki Honda, Musashino (JP)

(73) Assignee: NTT, Inc., Tokyo (JP)

( * ) Notice: Subject to any disclaimer, the term of this patent is extended or adjusted under 35 U.S.C. 154(b) by 59 days.

(21) Appl. No.: 18/289,755

(22) PCT Filed: Jun. 4, 2021

(86) PCT No.: PCT/JP2021/021428
§ 371 (c)(1),
(2) Date: Nov. 7, 2023

(87) PCT Pub. No.: WO2022/254712
PCT Pub. Date: Dec. 8, 2022

(65) Prior Publication Data
US 2024/0264034 A1    Aug. 8, 2024

(51) Int. Cl.
*G01M 11/02*    (2006.01)

(52) U.S. Cl.
CPC .................... *G01M 11/02* (2013.01)

(58) Field of Classification Search
CPC ..... G01M 11/02; G01M 11/319; G01M 11/39
See application file for complete search history.

(56) References Cited

U.S. PATENT DOCUMENTS

2006/0233554 A1* 10/2006 Ramachandran .. G02B 6/03644
398/141
2006/0263024 A1* 11/2006 Dong ....................... G02B 6/32
385/127
(Continued)

OTHER PUBLICATIONS

Oda et al "Light Intensity Distribution Measurement Method and Light Intensity Distribution Measurement Device", Jan. 14, 2021, WO 2021005800 A1 (Year: 2021).*
M. Yoshida, T. Hiraoka, and M. Nakazawa, "Mode Coupling Measurement at a Splice Point between Few-Mode Fibers Using a Synchronous Multi-Channel OTDR", in 2016 Optical Fiber Communications Conference and Exhibition (OFC) Th1J.4 (2016).
(Continued)

*Primary Examiner* — Sang H Nguyen
(74) *Attorney, Agent, or Firm* — Harness, Dickey & Pierce, P.L.C.

(57) ABSTRACT

An object is to provide an optical fiber test method and an optical fiber test device capable of acquiring a maximum loss of a higher-order mode at a connection point of an optical fiber transmission line through which a plurality of modes propagate.
The optical fiber test device according to the present invention includes: a light source unit 10 that allows probe light L1, which has a tunable wavelength and is continuous light, to enter one end T1 of an optical fiber in a fundamental mode and allows pulsed pump light L2, which is shifted to a high frequency side by a frequency at which a Brillouin interaction occurs with respect to the probe light L1, to enter the other end T2 of the optical fiber in a higher-order mode as a measurement target; and an analysis unit 20 that acquires, from a light intensity of the probe light L3 amplified by the pump light L2, a time waveform of an amplification component, calculates a connection loss of the pump light L2 at a connection point from a ratio of the amplification components before and after the connection point, acquires a wavelength dependency of the connection loss, detects a maximum value of the connection loss from the wavelength (Continued)

TE01

TM01 eHE21 oHE21

DIRECTION OF POLARIZED WAVE dependency of the connection loss, and sets the maximum value as a maximum loss of the higher-order mode at the connection point.

2 Claims, 4 Drawing Sheets

(56) References Cited

U.S. PATENT DOCUMENTS

| | | | | |
|---|---|---|---|---|
| 2012/0274927 A1* | 11/2012 | Li | ........................... | G01K 11/32 356/73.1 |
| 2015/0104139 A1* | 4/2015 | Brunet | .................... | H04J 14/07 385/124 |
| 2021/0003474 A1* | 1/2021 | Koshikiya | .......... | G01M 11/3145 |
| 2021/0018343 A1* | 1/2021 | Takahashi | .......... | G01D 5/35364 |
| 2023/0288466 A1* | 9/2023 | Oda | .................. | G01R 29/0885 |

OTHER PUBLICATIONS

H. Takahashi, C. Kito, K. Toge, T. Manabe, and F. Ito, "Distributed Measurement of Single-way Inter-modal Crosstalk in Spliced FMFs Based on BOTDA", in 2017 Optical Fiber Communications Conference and Exhibition (OFC), Th4H.3 (2017).

T. Oda, H. Takahashi, K. Toge, and T. Manabe, "Modal Attenuation Measurement in Spliced Few Mode Fibre Based on Inter-Modal Brillouin Gain Analysis", in 2018 European Conference on Optical Communication (ECOC), We2.7 (2018).

Y. Kokubun, T. Watanabe, S. Miura, and R. Kawata, "What is a mode in few mode fibers?: Proposal of MIMO-free mode division multiplexing using true eigenmodes", IEICE Electronics Express, 13(18), 1-12 (2016).

T. Yamaguchi, S. Miura, and Y. Kokubun, "Demonstration of true-eigenmode propagation in few-mode fibers by selective LP mode excitation and near-field observation", IEICE Electronics Express, 15(10), 20188004-20188004 (2018).

* cited by examiner

OPTICAL FIBER TEST METHOD AND OPTICAL FIBER TEST EQUIPMENT

CROSS-REFERENCE TO RELATED APPLICATIONS

This application is a 371 U.S. National Phase of International Application No. PCT/JP2021/021428, filed on Jun. 4, 2021. The entire disclosure of the above application is incorporated herein by reference.

TECHNICAL FIELD

The present disclosure relates to a measurement method and a measurement device capable of acquiring a maximum loss of a higher-order mode at a connection point of an optical fiber transmission line through which a plurality of modes propagate.

BACKGROUND ART

In recent years, with a rapid increase in transmission traffic, instead of a single-mode fiber (SMF) used in a current transmission line, a few-mode fiber (FMF) capable of using a plurality of propagation modes has attracted a lot of attention as a fiber capable of further increasing a capacity. In a transmission line using the FMF, the FMF is connected every several km. On the other hand, at these connection points, as the order of the propagation mode increases, a loss caused when passing through the connection point increases. For this reason, in order to evaluate a quality of the transmission line, it is desirable to measure a loss of a highest-order mode in which the loss is expected to be the largest for each connection point.

The FMF is connected not only when configuring the transmission line but also after operation. For connection after operation, a scene such as leading-in of a new FMF cable due to a failure such as a disaster or a cable route change according to city planning is assumed. Therefore, it is necessary to evaluate, by a distribution test, whether a loss of the highest-order mode at a portion in which connection is performed is within an allowable range. In addition, in a higher-order mode in which an electric field distribution is not uniform, in a circumferential direction, inside a cross-section of the optical fiber, for example, in a first higher-order mode ($LP_{11}$ mode), it is reported that the losses at the connection points exhibit different characteristics with respect to two orthogonal degeneration space modes. These two degeneration space modes are coupled to each other when propagating through the FMF, and thus the electric field distribution changes. In addition, since a change in the electric field distribution is also caused by a disturbance applied to the fiber, it can be said that the electric field distribution of the degeneration space mode varies depending on a position and a time in the fiber. That is, the degeneration space mode passes through the connection point with a different electric field distribution at each time, and a value of a loss that occurs at that time is also different. As a result, the loss at the connection point may also vary. For this reason, in order to evaluate whether the loss at the connection point is within the allowable range, it is necessary to evaluate a maximum loss that the highest-order mode can take.

As a method for measuring a loss and a crosstalk at a connection point of the FMF, a method based on OTDR has been proposed (for example, refer to Non Patent Literature 1). In the method, a test light pulse enters from one end of the FMF in a certain propagation mode, and back-scattered light generated by the incident test light pulse is separated into each mode component at the same end and is individually measured. In the measurement of the back-scattered light, it is possible to acquire an average value of a loss caused when the test light pulse propagates and a loss caused when the scattered light of the test light pulse propagates backward.

CITATION LIST

Non Patent Literature

Non Patent Literature 1: M. Yoshida, T. Hirooka, and M. Nakazawa, "Mode Coupling Measurement at a Splice Point between Few-Mode Fibers Using a Synchronous Multi-Channel OTDR", in 2016 Optical Fiber Communications Conference and Exhibition (OFC) Th1J. 4 (2016).

Non Patent Literature 2: H. Takahashi, C. Kito, K. Toge, T. Manabe, and F. Ito, "Distributed Measurement of Single-way Inter-modal Crosstalk in Spliced FMFs Based on BOTDA", in 2017 Optical Fiber Communications Conference and Exhibition (OFC), Th4H.3 (2017).

Non Patent Literature 3: T. Oda, H. Takahashi, K. Toge, and T. Manabe, "Modal Attenuation Measurement in Spliced Few Mode Fibre Based on Inter-Modal Brillouin Gain Analysis", in 2018 European Conference on Optical Communication (ECOC), We2.7 (2018).

Non Patent Literature 4: Y. Kokubun, T. Watanabe, S. Miura, and R. Kawata, "What is a mode in few mode fibers?: Proposal of MIMO-free mode division multiplexing using true eigenmodes", IEICE Electronics Express, 13 (18), 1-12 (2016).

Non Patent Literature 5: T. Yamaguchi, S. Miura, and Y. Kokubun, "Demonstration of true-eigenmode propagation in few-mode fibers by selective LP mode excitation and near-field observation", IEICE Electronics Express, 15 (10), 20188004-20188004 (2018).

SUMMARY OF INVENTION

Technical Problem

However, since the electric field distribution of the higher-order mode varies as described above, the electric field distribution of the test light pulse may be different from the electric field distribution of the back-scattered light. This means that a maximum of loss values caused at the same connection point in a round trip cannot be acquired by only observing the average of the loss values because the caused loss values are different from each other in spite of passing through the connection point. Actually, it has been reported that a crosstalk obtained in a round trip is different from a crosstalk obtained in a one-way trip (for example, refer to Non Patent Literature 2). For this reason, there is a problem that acquiring a maximum loss of the highest-order mode requires a method capable of measuring a loss obtained in a one-way trip together with changing the electric field distribution of the highest-order mode at a timing when passing through the connection point of the FMF.

Therefore, in order to solve the above-described problems, an object of the present invention is to provide an optical fiber test method and an optical fiber test device capable of acquiring a maximum loss of a higher-order mode at a connection point of an optical fiber transmission line through which a plurality of modes propagate.

Solution to Problem

In order to achieve the above object, according to the present invention, there are provided an optical fiber test method and an optical fiber test device capable of acquiring a maximum value of a loss, measured by performing a Brillouin optical time domain analysis method (BOTDA), multiple times, together with changing wavelengths of probe light and pump light.

Specifically, according to the present invention, there is provided an optical fiber test method for measuring a maximum loss of a higher-order mode at a connection point of a few-mode optical fiber, the optical fiber test method including: allowing probe light, which is continuous light, to enter one end of the few-mode optical fiber in a fundamental mode; allowing pulsed pump light, which is shifted to a high frequency side by a frequency at which a Brillouin interaction occurs with respect to the probe light, to enter the other end of the few-mode optical fiber in a higher-order mode as a measurement target when the probe light enters; acquiring, from a light intensity of the probe light amplified by the pump light, a time waveform of an amplification component of the probe light amplified by the pump light; calculating a connection loss of the pump light at the connection point from a ratio of the amplification components before and after the connection point; acquiring a wavelength dependency of the connection loss by changing wavelengths of the probe light and the pump light; and detecting a maximum value of the connection loss from the wavelength dependency of the connection loss and setting the maximum value as a maximum loss of the higher-order mode at the connection point.

Further, according to the present invention, there is provided an optical fiber test device that measures a maximum loss of a higher-order mode at a connection point of a few-mode optical fiber, the optical fiber test device including: a light source unit that allows probe light, which has a tunable wavelength and is continuous light, to enter one end of the few-mode optical fiber in a fundamental mode and allows pulsed pump light, which is shifted to a high frequency side by a frequency at which a Brillouin interaction occurs with respect to the probe light, to enter the other end of the few-mode optical fiber in a higher-order mode as a measurement target; and an analysis unit that acquires, from a light intensity of the probe light amplified by the pump light, a time waveform of an amplification component of the probe light amplified by the pump light, calculates a connection loss of the pump light at the connection point from a ratio of the amplification components before and after the connection point, acquires a wavelength dependency of the connection loss, detects a maximum value of the connection loss from the wavelength dependency of the connection loss, and sets the maximum value as a maximum loss of the higher-order mode at the connection point.

The optical fiber test method and the optical fiber test device use a fact that a variation period of the electric field distribution of the higher-order mode changes on condition that the incident wavelength to the FMF is changed. By changing the wavelength of the incident pump light, the electric field distribution of the higher-order mode passing through the connection point is changed. By acquiring a loss, caused by the pump light, by using the BOTDA, a variation in the loss (wavelength dependency) of the higher-order mode that may occur at the connection point is acquired. In addition, a maximum value of the variation in the loss is set as a maximum loss of the higher-order mode at the connection point of the FMF.

Therefore, according to the present invention, it is possible to provide an optical fiber test method and an optical fiber test device capable of acquiring a maximum loss of a higher-order mode at a connection point of an optical fiber transmission line through which a plurality of modes propagate.

Advantageous Effects of Invention

According to the present invention, it is possible to provide an optical fiber test method and an optical fiber test device capable of acquiring a maximum loss of a higher-order mode at a connection point of an optical fiber transmission line through which a plurality of modes propagate.

DESCRIPTION OF EMBODIMENTS

Figure 1:
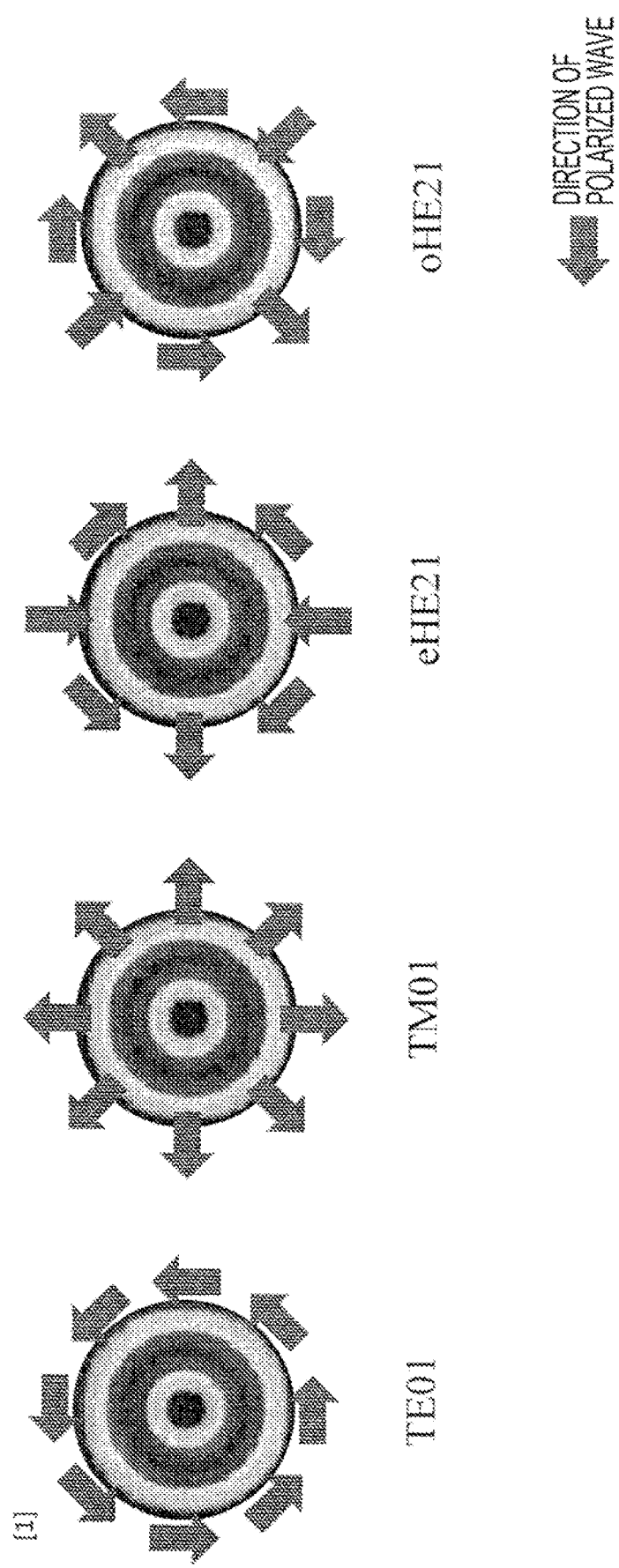
FIG. 1 is a diagram for explaining a higher-order mode.

Embodiments of the present invention will be described with reference to the accompanying drawings. The embodiments to be described below are examples of the present invention, and the present invention is not limited to the embodiments to be described below. Note that components having the same reference numerals in the present specification and the drawings denote the same components.

In the optical fiber test device and the optical fiber test method according to the present embodiment, while changing an electric field distribution of a higher-order mode passing through a connection point of the FMF, a loss of the higher-order mode that occurs at the connection point is measured. By this measurement, a maximum loss of the higher-order mode at the connection point is acquired. In the following description, measurement of the connection loss of the higher-order mode and a variation in the electric field distribution of the higher-order mode will be described. For the sake of simplicity, a two-mode fiber (TMF) through which only two modes propagate is assumed, and an electric field distribution of an $LP_{11}$ mode of the TMF is considered.

[Measurement of Connection Loss of $LP_{11}$ Mode]

As in Non Patent Literature 3, a measurement method of a loss of a highest-order mode based on a Brillouin optical time domain analysis method (BOTDA) has been proposed. In the measurement method, the loss of the highest-order mode of the fiber can be measured by using a characteristic in which a Brillouin frequency shift differs for each mode. Further, in the BOTDA, only a loss caused by a test light pulse (pump light) can be acquired, and thus a loss corresponding to an electric field distribution of the test light pulse can be acquired. In the measurement method, probe light of an $LP_{01}$ mode enters one side of the TMF, and pump light of an $LP_{11}$ mode enters the other side of the TMF. The probe light enters as continuous light, and the pump light enters in a pulse state. In the TMF, the probe light and the pump light overlap with each other, and thus a Brillouin interaction occurs. Therefore, the probe light of the $LP_{01}$ mode is amplified by the pump light of the $LP_{11}$ mode. Here, after light is emitted from the TMF, by observing an intensity of the probe light, an amplification amount of the probe light is calculated. The amplification amount corresponds to the intensity of the pump light of the $LP_{11}$ mode of the TMF. Therefore, a connection loss of the $LP_{11}$ mode can be acquired by comparing the amplification amounts of the probe light before and after the connection point.

[Variation in Electric Field Distribution of Higher-Order Mode of TMF]

The LP mode is a mode obtained when weakly-guiding approximation is applied to the fiber, and is configured by superposition between vector modes. A relationship between each $LP_{11}$ mode and the vector mode can be expressed by the following Equation (refer to, for example, Non Patent Literature 4).

[Math. 1]

$$\begin{bmatrix} LP_{11ax} \\ LP_{11ay} \\ LP_{11bx} \\ LP_{11by} \end{bmatrix} = \frac{1}{\sqrt{2}} \begin{bmatrix} 1 & 0 & 1 & 0 \\ 0 & 1 & 0 & 1 \\ 0 & -1 & 0 & 1 \\ 1 & 0 & -1 & 0 \end{bmatrix} \begin{bmatrix} V_e^+ \\ V_o^+ \\ V_e^- \\ V_o^- \end{bmatrix} \quad (1)$$

Here, $V_e^+$, $V_o^+$, $V_e^-$, and $V_o^-$ respectively indicate complex amplitudes of a $TM_{01}$ mode, a $TE_{01}$ mode, an $eHE_{21}$ mode, and an $oHE_{21}$ mode. FIG. 1 is a diagram illustrating the $TM_{01}$ mode, the $TE_{01}$ mode, the $eHE_{21}$ mode, and the $oHE_{21}$ mode.

From Equation (1), it can be seen that each $LP_{11}$ mode is configured by superposition of two vector modes. Here, $LP_{11ax}$ and $LP_{11by}$ indicate TMH mode groups, and $LP_{11ay}$ and $LP_{11bx}$ indicate TEH mode groups.

Figure 2:
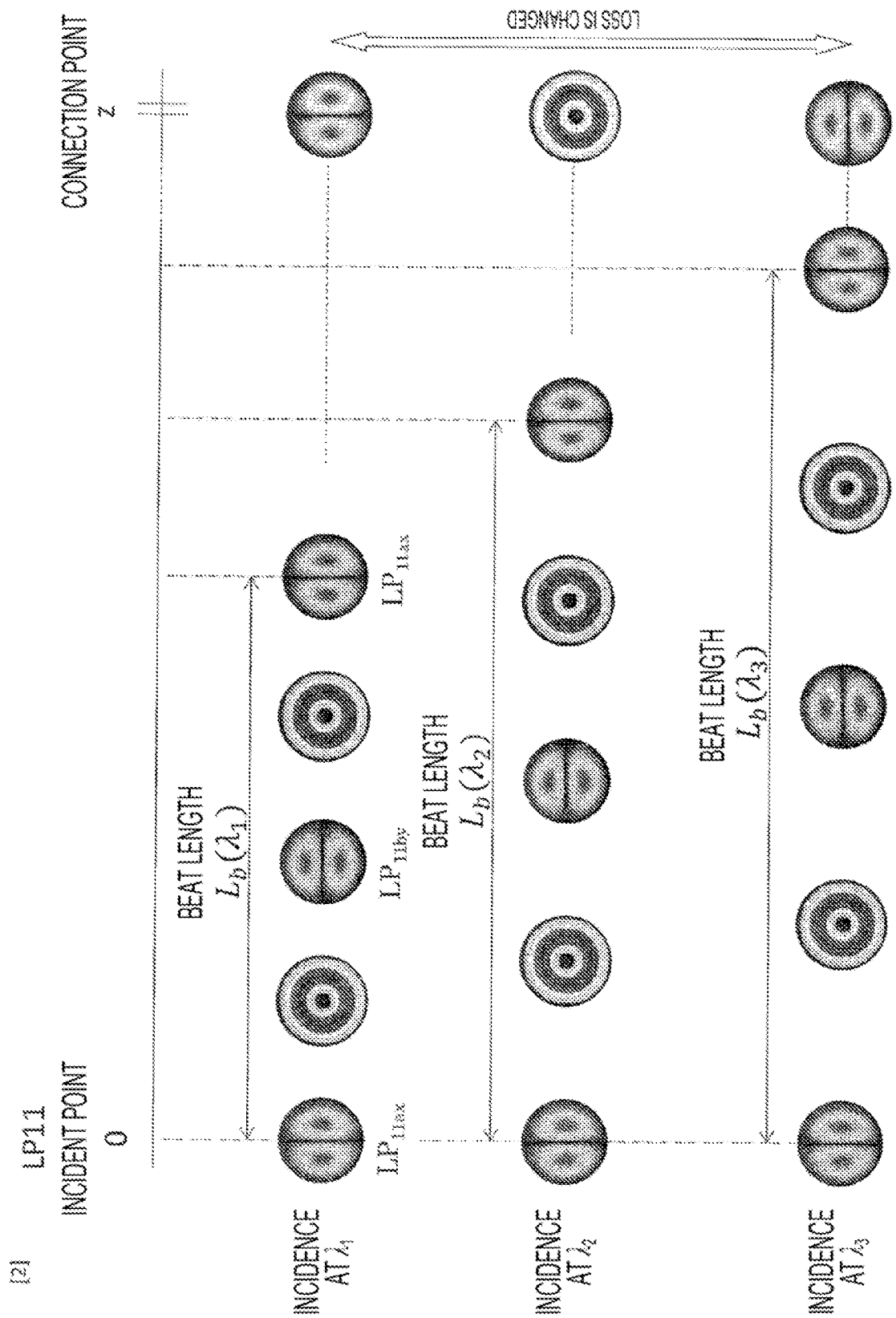
FIG. 2 is a diagram for explaining a principle of an optical fiber test method according to the present invention.

It is known that an electric field distribution of the $LP_{11}$ mode of the TMF varies due to propagation in the TMF. As an example, considering a case where $LP_{11ax}$ is entered, as illustrated in FIG. 2, $LP_{11max}$ and $LP_{11by}$ which are TMH mode groups periodically appear in the fiber. Here, a beat length $L_b$ of the TMH mode group in propagation is expressed by the following Equation.

[Math. 2]

$$L_b = \frac{2\pi}{\beta_{HE21} - \beta_{TM01}} \quad (2)$$

Here, $\beta_{HE21}$ and $\beta_{TM01}$ indicate propagation constants of $eHE_{21}$ and $TM_{01}$.

From Equation (2), it can be seen that a variation period of the electric field distribution in propagation is determined by a difference in the propagation constant of each vector mode of the $LP_{11}$ mode. Here, the electric field distribution of the $LP_{11}$ mode when passing through the connection point is determined by the variation period and a distance to the connection point. On the other hand, the propagation constant $\beta$ of each vector mode varies depending on a disturbance applied to the fiber. Thus, each vector mode passes through the connection point with any electric field distribution that appears in the variation period of FIG. 2 at times.

In the optical fiber test device and the optical fiber test method according to the present embodiment, a characteristic that the propagation constant $\beta$ of each vector mode varies depending on a wavelength to be used (refer to, for example, Non Patent Literature 5) is used. Specifically, when an incident wavelength is changed, as illustrated in FIG. 2, the variation period of the electric field distribution of the $LP_{11}$ mode also changes. Therefore, by changing a wavelength of the incident pump light, it is possible to change the electric field distribution of the $LP_{11}$ mode passing through the connection point of the TMF. By acquiring a loss caused by the pump light by using the BOTDA while changing the electric field distribution as described above, it is possible to acquire a variation in the loss of the $LP_{11}$ mode that may occur at the connection point.

In the optical fiber test device and the optical fiber test method according to the present embodiment, it is possible to change the electric field distribution of the higher-order mode of the optical fiber FUT by changing the wavelength. Therefore, it is possible to acquire a variation in the connection loss at that time. On the other hand, it is known that a mode field diameter (MFD) also changes with a change in the wavelength and the change also affects the connection loss. For example, in Non Patent Literature 5, it is reported that all electric field distributions are obtained by changing the wavelength by approximately 10 nm. In a case where the wavelength changes by approximately 10 nm, an influence of the change in the MFD on the connection loss can be ignored.

EXAMPLE

Figure 3:
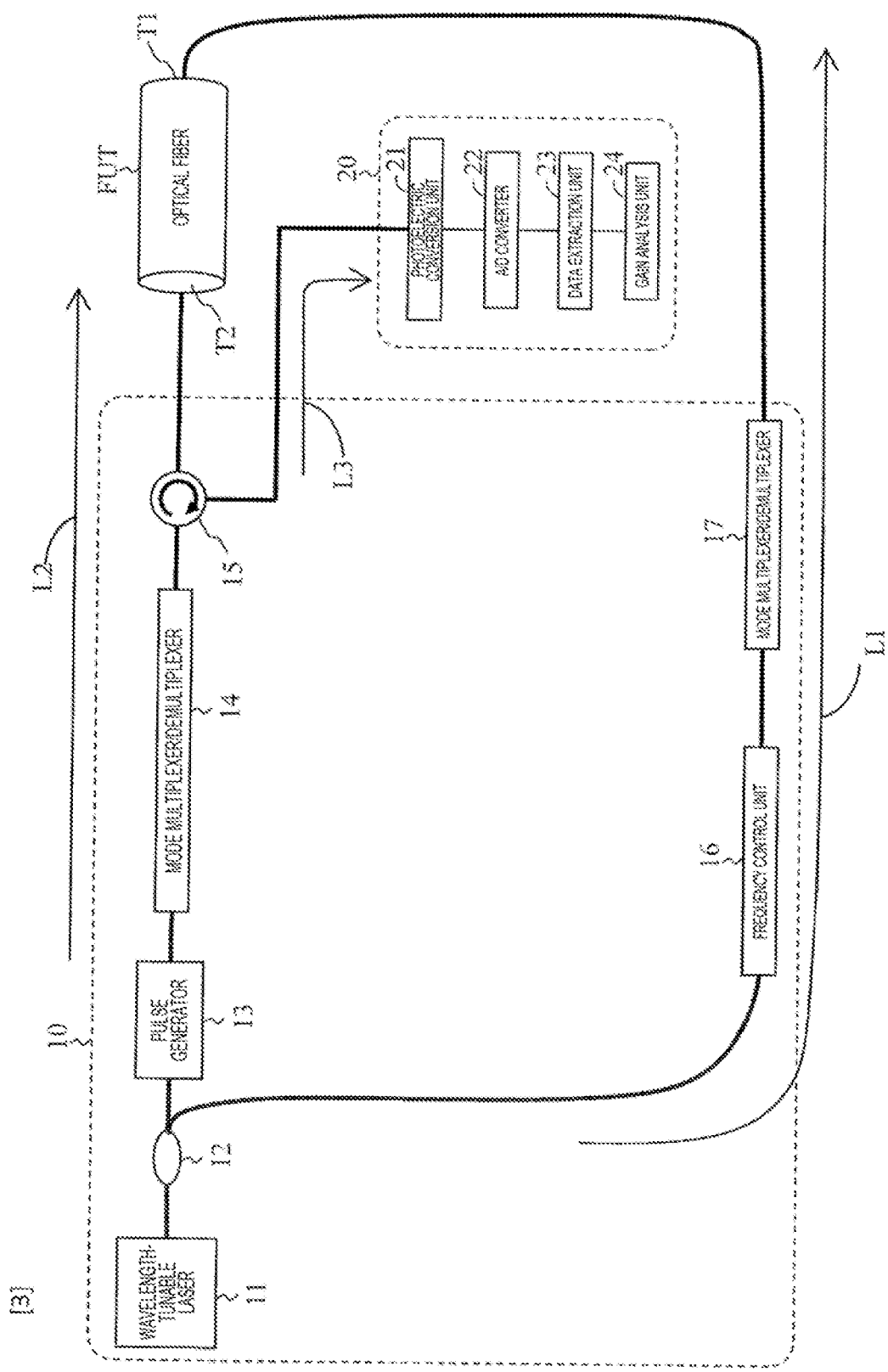
FIG. 3 is a diagram illustrating an optical fiber test device according to the present invention.

FIG. 3 is a diagram illustrating the optical fiber test device according to the present embodiment. The optical fiber test device is an optical fiber test device that measures a maximum loss of a higher-order mode at a connection point of a few-mode optical fiber FUT, the optical fiber test device including: a light source unit 10 that allows probe light L1, which has a tunable wavelength and is continuous light, to enter one end T1 of the few-mode optical fiber FUT in a fundamental mode and allows pulsed pump light L2, which is shifted to a high frequency side by a frequency at which a Brillouin interaction occurs with respect to the probe light L1, to enter the other end T2 of the few-mode optical fiber FUT in a higher-order mode as a measurement target; and an analysis unit 20 that acquires, from a light intensity of the probe light L3 amplified by the pump light L2, a time waveform of an amplification component of the probe light L3 amplified by the pump light L2, calculates a connection loss of the pump light L2 at the connection point from a ratio of the amplification components before and after the connection point, acquires a wavelength dependency of the connection loss, detects a maximum value of the connection loss from the wavelength dependency of the connection loss, and sets the maximum value as a maximum loss of the higher-order mode at the connection point.

The light source unit 10 includes a wavelength-tunable laser 11, a branching element 12, a pulse generator 13, a mode multiplexer/demultiplexer 14, an optical circulator 15, a frequency control unit 16, and a mode multiplexer/demultiplexer 17.

The analysis unit 20 includes a photoelectric conversion unit 21, an A/D converter 22, a data extraction unit 23, and a gain analysis unit 24.

A position z of the connection point of the optical fiber FUT may be known (a design value), or may be determined from back-scattered light, a time waveform of a Brillouin amplification amount, or the like by using the optical fiber test device.

The wavelength-tunable laser 11 generates coherent light at a certain wavelength. The light output from the wavelength-tunable laser 11 is branched into two light beams by the branching element 12. In the two light beams, one light beam is probe light L1, and the other light beam is pump light L2. Here, the wavelength-tunable laser 11 may be a wavelength-tunable light source capable of changing a wavelength, or may have a configuration including a wavelength-tunable mechanism in which a nonlinear optical device or the like is used in combination with a single wavelength light source. The wavelength-tunable mechanism is used to change the electric field distribution of the pump light L1 in the optical fiber FUT. Therefore, it is only necessary to change the wavelength by an amount by which the electric field distribution can take the entire states at the position z in FIG. 2. For example, a wavelength change amount is 10 nm in a C band (refer to, for example, Non Patent Literature 5).

The probe light L1 is given a frequency difference of approximately 10 GHz to 11 GHz corresponding to a Brillouin frequency shift (BFS) with respect to the pump light L2, by the frequency control unit 16, and then enters the optical fiber FUT in a fundamental mode by the mode multiplexer/demultiplexer 17. The frequency control unit 16 may control an optical frequency difference by using an external modulator such as an SSB modulator using $LiNb_3$. When two lasers having different frequencies (wavelengths) are used as different light sources of the pump light L2 and the probe light L1, the frequency control unit 16 may control an optical frequency difference between the two lasers.

On the other hand, the pump light L2 is pulsed by the pulse generator 13, is converted from the fundamental mode to a desired higher-order mode by the mode multiplexer/demultiplexer 14, and enters the optical fiber FUT. In the optical fiber FUT, the pump light L2 and the probe light L1 collide with each other, and thus the probe light L1 is amplified.

The probe light L3 amplified by the pump light L2 is transmitted to the photoelectric conversion unit 21 by the optical circulator 15. The photoelectric conversion unit 21 converts the light intensity of the probe light L3 into an electrical signal, and the A/D converter 22 converts the electrical signal into digital data. The analysis unit 20 analyzes an amplification amount from the digital data.

Specific analysis of the Brillouin amplification amount performed by the analysis unit 20 is as follows. First, the data extraction unit 23 acquires a reference intensity of the probe light in a case where the pump light L2 does not enter (only the probe light L1 enters). Thereafter, the data extraction unit 23 acquires a signal intensity in a case where the pump light L2 and the probe light L1 enter. The gain analysis unit 24 calculates an increase amount from the reference intensity by the pump light L2 in a longitudinal direction of the optical fiber FUT by comparing the signal intensity with the reference intensity. Further, the gain analysis unit 24 acquires a loss value caused by the pump light L2 when passing through the connection point by comparing the amplification amounts before and after the connection point of the optical fiber FUT.

Next, in order to acquire a maximum loss value of the higher-order mode at the connection point of the optical fiber FUT, the measurement is repeatedly performed while changing the wavelengths of the pump light L2 and the probe light L1 by the wavelength-tunable laser 11. Thereby, the electric field distribution of the pump light L2 at the connection point of the optical fiber FUT varies, and thus it is possible to acquire a variation in the connection loss due to the variation in the electric field distribution. Therefore, the optical fiber test device can acquire a maximum loss from the variation.

[Measurement Procedure]

Figure 4:
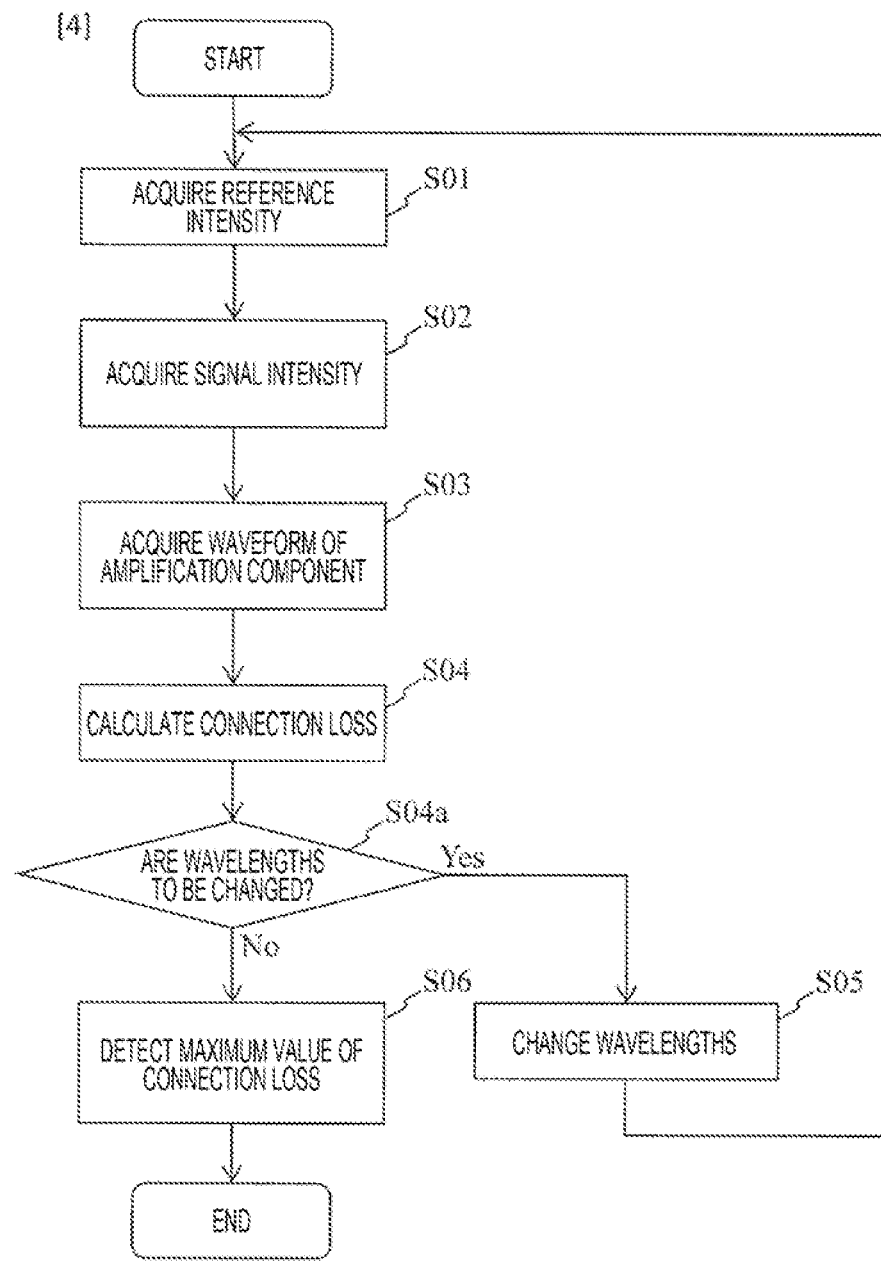
FIG. 4 is a diagram for explaining the optical fiber test method according to the present invention.

FIG. 4 is a diagram for explaining a measurement procedure performed by the optical fiber test device. The measurement procedure is an optical fiber test method for measuring a maximum loss of a higher-order mode at a connection point of a few-mode optical fiber FUT, the optical fiber test method including: allowing probe light L1, which is continuous light, to enter one end T1 of the few-mode optical fiber FUT in a fundamental mode (step S01, a step of acquiring a reference intensity in a longitudinal direction of the FUT); allowing pulsed pump light L2, which is shifted to a high frequency side by a frequency at which a Brillouin interaction occurs with respect to the probe light L1, to enter the other end T2 of the few-mode optical fiber FUT in a higher-order mode as a measurement target when the probe light L1 enters (step S02, a step of acquiring a signal intensity in the longitudinal direction of the FUT); acquiring, from a light intensity of the probe light L3 amplified by the pump light L2, a time waveform of an amplification component of the probe light L1 amplified by the pump light L2 (step S03, a step of acquiring an amplification component in the longitudinal direction of the FUT by subtracting the reference intensity from the signal intensity); calculating a connection loss of the pump light L2 at the connection point from a ratio of the amplification components before and after the connection point (step S04); acquiring a wavelength dependency of the connection loss by changing wavelengths of the probe light L1 and the pump light L2 where the wavelengths are changed within a desired wavelength range (step S05); and detecting a maximum value of the connection loss from the wavelength dependency of the connection loss where changing of the wavelengths within the desired wavelength range is completed, and setting the maximum value as a maximum loss of the higher-order mode at the connection point (step S06).

Other Examples

The analysis unit of the optical fiber test device according to the present invention can also be implemented by a computer and a program, and the program can be provided by being recorded in a recording medium or provided via a network.

[Effects]

In the present invention, by changing the wavelength of the incident light, the electric field distribution of the higher-order mode when passing through the connection point varies. Thus, it is possible to acquire the variation in the connection loss at that time. Thereby, it is possible to acquire the maximum loss.

REFERENCE SIGNS LIST

10 Light source unit
11 Wavelength-tunable laser
12 Branching element
13 Pulse generator
14 Mode multiplexer/demultiplexer
15 Optical circulator
16 Frequency control unit
17 Mode multiplexer/demultiplexer
20 Analysis unit
21 Photoelectric conversion unit
22 A/D converter
23 Data extraction unit
24 Gain analysis unit

The invention claimed is:

1. An optical fiber test method for measuring a maximum loss of a higher-order mode at a connection point of a few-mode optical fiber, the optical fiber test method including: allowing probe light, which is continuous light, to enter one end of the few-mode optical fiber in a fundamental mode;

allowing pulsed pump light, which is shifted to a high frequency side by a frequency at which a Brillouin interaction occurs with respect to the probe light, to enter the other end of the few-mode optical fiber in a higher-order mode as a measurement target when the probe light enters;

acquiring, from a light intensity of the probe light amplified by the pump light, a time waveform of an amplification component of the probe light amplified by the pump light;

calculating a connection loss of the pump light at the connection point from a ratio of the amplification components before and after the connection point;

acquiring a wavelength dependency of the connection loss by changing wavelengths of the probe light and the pump light; and detecting a maximum value of the connection loss from the wavelength dependency of the connection loss and setting the maximum value as a maximum loss of the higher-order mode at the connection point.

2. An optical fiber test device that measures a maximum loss of a higher-order mode at a connection point of a few-mode optical fiber, the optical fiber test device comprising:

a light source unit that allows probe light, which has a tunable wavelength and is continuous light, to enter one end of the few-mode optical fiber in a fundamental mode and allows pulsed pump light, which is shifted to a high frequency side by a frequency at which a Brillouin interaction occurs with respect to the probe light, to enter the other end of the few-mode optical fiber in a higher-order mode as a measurement target; and an analysis unit that acquires, from a light intensity of the probe light amplified by the pump light, a time waveform of an amplification component of the probe light amplified by the pump light, calculates a connection loss of the pump light at the connection point from a ratio of the amplification components before and after the connection point, acquires a wavelength dependency of the connection loss, detects a maximum value of the connection loss from the wavelength dependency of the connection loss, and sets the maximum value as a maximum loss of the higher-order mode at the connection point.

* * * * *